(12) United States Patent
Frese et al.

(10) Patent No.: US 6,939,605 B2
(45) Date of Patent: Sep. 6, 2005

(54) MULTI-LAYER COATING

(75) Inventors: Peter Frese, Wuppertal (DE); Klaus Taennert, Wuppertal (DE); Martin Wulf, Duesseldorf (DE); Rudolf Zentel, Nierstein (DE); Marc Egen, Wiesbaden (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 69 days.

(21) Appl. No.: 10/441,371

(22) Filed: May 19, 2003

(65) Prior Publication Data

US 2004/0234746 A1 Nov. 25, 2004

(51) Int. Cl.⁷ ............................. B32B 5/16; B60R 13/00
(52) U.S. Cl. ......................... 428/327; 428/31; 428/323
(58) Field of Search ........................... 428/31, 323, 327

(56) References Cited

U.S. PATENT DOCUMENTS 6,337,131 B1    1/2002  Rupaner et al.
6,716,475 B1 *  4/2004  Fink et al. .................. 426/660
2003/0102217 A1  6/2003  Kasahara et al.

FOREIGN PATENT DOCUMENTS

| DE | 199 09 944 A1 | 10/1999 |
| EP | 0 955 323 A1 | 10/1999 |
| WO | WO 01/88044 A1 | 11/2001 |
| WO | WO 02/44301 A2 | 6/2002 |
| WO | WO 03/058299 | 7/2003 |

OTHER PUBLICATIONS

The International Search Report and the Written Opinion of the International Search Authority, Application No. PCT/US2004/015267, Mailed: Oct. 26, 2004.

* cited by examiner

*Primary Examiner*—Sheeba Ahmed
(74) *Attorney, Agent, or Firm*—Steven C. Benjamin

(57) ABSTRACT

A multi-layer coating for coating a substrate surface, comprising at least one color-imparting layer, which contains three-dimensional photonic crystals as effect-imparting interference pigments.

16 Claims, No Drawings

MULTI-LAYER COATING

FIELD OF INVENTION

The invention relates to a multi-layer coating for substrate surfaces containing an interference pigment-carrying layer, for decoration of the substrate surface, and to a method for producing the multi-layer coating.

BACKGROUND OF THE INVENTION

Various examples of decorative surfaces are known, in particular from the automotive coating industry, for example, individual coats, such as special effect coats, coats in special colors or coats in the form of pictures, patterns or ornaments, but also the application of correspondingly designed adhesive film. Various types of pigment may be used for coats of this type, for example, simple color pigments, mica pigments, special effect pigments.

Novel pigments have been found which resemble naturally occurring opals and wherein the color activity is produced by Bragg scattering of the incident light on the grid planes of the spheres arranged in a crystal-like manner.

WO 01/88044 describes pigments with an opalescent effect. The pigment particles consist of monodisperse spheres in a three-dimensional, tightly packed and regularly arranged structure, also called three-dimensional photonic crystals, with a diameter of 50 nm to 2 $\mu$m. The method for producing these particles may be used to coat substrate surfaces in that the monodisperse spheres are applied in suspension to the substrate surface and the liquid medium is removed.

WO 02/44301 describes similar pigments with an opalescent effect, of which the structure is formed by arrangement of monodisperse spheres and retention of smaller particles in the cavities between the monodisperse spheres.

EP-A 955 323 describes core/shell particles which may be used as special effect pigments to produce coatings, paints and inks. With respect to their cores, the particles may have a regular arrangement and are based substantially on high molecular polymers. They may be applied to the substrates in the form of solid, liquid or paste preparations with the aid of auxiliary constituents and additives.

SUMMARY OF THE INVENTION

The invention provides a multi-layer coating for substrate surfaces which is distinguished by high optical brilliance, a very good color flop and high color stability. Furthermore, the demands made on a multi-layer coating, in particular for vehicle parts and vehicle body parts, such as very good intermediate adhesion of the individual layers to one another, are met.

The multi-layer coating contains at least one color-imparting layer which contains three-dimensional photonic crystals as effect-imparting interference pigments.

DETAILED DESCRIPTION

The color-imparting layer containing the three-dimensional photonic crystals may be a coat containing coating binders and other coating components, and it may also contain the photonic crystals without the presence of coating binders and coating components.

The photonic crystals may, for example, be used in a color-imparting base, intermediate or top layer within the multi-layer coating according to the invention. This may be brought about by applying the crystals in the form of a solid or liquid composition to the substrate to be coated. The monodisperse spheres may be dispersed in a suitable dispersing agent and the resulting dispersion may be applied, for example, in the case of a base layer, either directly to the substrate surface or to a priming coat covering the substrate surface.

The photonic crystals which may be used, according to the invention, may also be worked into a coating composition, for example, into a conventional base coat or top coat composition. The resulting coating preparation containing the photonic crystals may be processed as a color-imparting coat in a conventional manner as a liquid or powder coat within the scope of the multi-layer coating according to the invention.

Therefore a multi-layer coating may be produced on substrate surfaces which, for example, consist of a priming coat, a layer containing the photonic crystals following thereon and a transparent top coat arranged thereon.

The multi-layer coating according to the invention may, for example, also consist of a priming coat, a base coat arranged thereon which contains the photonic crystals, and a transparent top coat.

It is also possible to produce a multi-layer coating which, for example, consists of an optionally present priming coat, optionally present intermediate layer, a conventional base coat and a top layer which can be a top coat containing the photonic crystals. In this case, the layers of the multi-layer coating located below the top layer may be free from photonic crystals.

The multi-layer coating according to the invention may be used with and without priming coat. The priming coat may be a coat conventionally used in the coating industry.

In principle, more than one layer of the multi-layer coating according to the invention may contain the photonic crystals as color-imparting agents.

The crystals which may be used according to the invention have an opalescent effect and a mean particle size in the range of 5 to 500 $\mu$m, the particles generally consisting of monodisperse spheres with a diameter of 50 nm to 2 $\mu$m and being arranged in a three-dimensional, tightly packed, regular structure. This structure may be mechanically stabilized by physical or chemical modifications to maintain the opalescent effect of the particles. Monodisperse spheres with a diameter of 150 to 1,500 nm are preferably used, particularly preferably with a diameter of 200 to 500 nm.

To ensure the optical properties of the photonic crystals, the difference in the refractive indices of the photonic crystals and of the coating preparation including binders and other coating components should be in a range of 0.01 to 2, preferably 0.02 to 1.5. Optimal refractive index differences are, for example, in the range of 0.1 to 1.5, deviations from this also being possible.

The monodisperse spheres of the photonic crystals consist, for example, of metal oxides, metal chalcogenides or of silicon dioxide. Spheres consisting of silicon dioxide may also be coated with non-absorbent metal oxides such as titanium oxide, zirconium oxide, zinc oxide, tin oxide or aluminum oxide, or with absorbent metal oxides, such as iron oxide. Monodisperse spheres may also consist of metal oxides, such as titanium dioxide, zirconium oxide, zinc oxide, tin oxide, aluminium oxide and mixtures thereof. These may be coated with organic materials, for example, silanes.

Crystals known as inverse photonic crystals may also be used. These may be crystals based on a metal oxide-resinframework from which the monodisperse spheres are removed. It is known, for example, to fill three-dimensional sphere packings consisting of $SiO_2$ spheres with polystyrene and then to remove the $SiO_2$ spheres so a photonic crystal results as a negative impression of the tight sphere packing. This inverse photonic crystal may have the same color properties as the direct photonic crystal.

Inverse photonic crystals on the basis of metal chalcogenides are preferably used.

Monodisperse spheres which consist of polymers, for example, polystyrene, polyester, polyamides, polyurethane or poly(meth)acrylates, may also be used. Polymer spheres of this type may contain metal oxide inclusions.

Monodisperse spheres which are produced from fluorinated (meth)acrylates, in particular fluorinated alkyl(meth) acrylates with alkyl groups with C2 to C8 are particularly suitable. Examples include trifluoroethylmethacrylate, perfluoropropylmethacrylate, perfluorobutylmethacrylate; wherein, the resulting polymers may also have contents of tetrafluorobutylbis(meth)acrylate or pentaerythritoltetra (meth)acrylate units in addition to fluorinated side chains. These polymers may be crosslinked, in which case they may be self-crosslinking or may be caused to crosslink by the use of crosslinking agents. Examples of crosslinking agents are cinnamoylalkyl(meth)acrylates, tetrafluorobutylbis(meth) acrylates or pentaerythritoltetra(meth)acrylates.

Photonic crystals based on fluorinated, crosslinked poly (meth)acrylates are preferably used for the multi-layer coating according to the invention.

Polymers of this type may be produced by suspension polymerization of the monomers. FIG. 1 shows by way of example the production of a polymethacrylate from 2,2,2-trifluoroethylmethacrylate and crosslinking with pentaerythritoltetra-methacrylate (PEMA):

FIG. 1

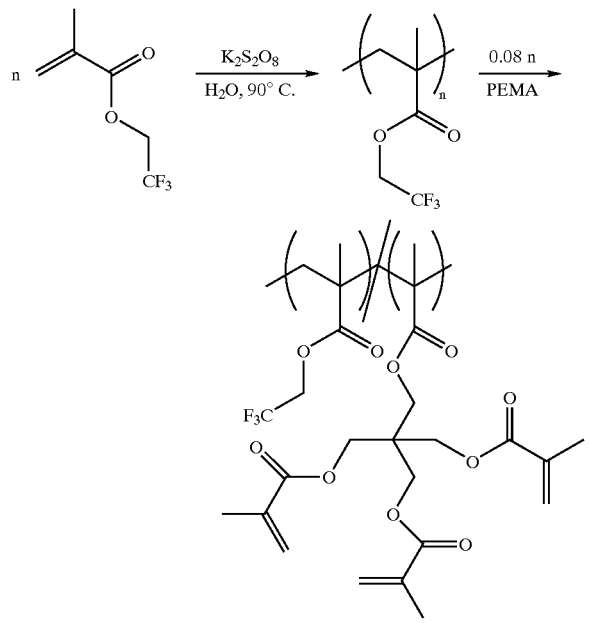

The photonic crystals which may be used according to the invention may be produced, for example, by droplet methods or by continuous coil coating. For this purpose, the suspension of monodisperse spheres suspended in a liquid medium are sprayed so drops form on the surface to be sprayed, or the suspension is deposited onto a substrate as a liquid film. After drying and solidifying, the corresponding photonic crystals are produced and may be removed from the surface by a dry or wet method, for example, by stripping, ultrasound treatment, liquid or gas irradiation. The shape of the particles may be controlled in the process, for example, by concentration in the suspension, drop diameter, speed of drying.

The resulting particles may optionally be physically and chemically stabilized in order to obtain the structure thereof. Chemical stabilization connects the spheres by chemical modification of the surface of the spheres, for example, by the addition of soluble silicates, polymerizable aluminum compounds or curable polymer side chains, e.g., cinnamoylalkyl side chains. The surface of the spheres may also be modified in such a way that after supplying heat, thermal radiation or UV radiation, the spheres are crosslinked with one another so solidification of the structure may be induced.

The particles produced from the monodisperse spheres may have a mean particle size of 5 to 500 $\mu$m, preferably to 25 $\mu$m, wherein the particles may have both a platelet-like and a spherical structure.

The photonic crystals may be present in the base, intermediate or top coat composition in a concentration of 0.1 to 70 weight %, preferably in a concentration of 1 to 20 weight %, based on the coating composition.

Both liquid and powder coats may be equipped with the photonic crystals according to the invention as base, intermediate or top coat. The coating compositions conventionally used in the paint industry may be used for this purpose. Water- or solvent-based coats may, for example, be used as liquid coats.

The liquid and powder coats may be based on conventional coating binders, for example, polyester, epoxide, poly(meth)acrylate, polyamide, polycarbonate and/or polyurethane resins, aminoplastic and phenoplastic resins.

Conventional crosslinking agents, for example, formaldehyde condensation resins, such as phenol formaldehyde condensation resins and amine formaldehyde condensation resins, polyisocyanates, dicyandiamide compounds, dicarboxylic acids and expoxide group-containing crosslinking agents may be used for the above mentioned binders. These are familiar to the person skilled in the art employed in the paint industry. The binders may also be self-crosslinking.

Water-miscible solvents or water-immiscible solvents may be used as solvents. Examples of suitable solvents include mono- or polyhydric alcohols, glycolethers or esters, glycols, ketones, aromatic or aliphatic hydrocarbons, alkylpyrrolidones, ethers, cyclic urea derivatives.

Pigments, conventional paint additives, such as plasticizers, film forming agents, fillers, thickeners, flow control agents and catalysts to accelerate crosslinking in the paint composition may also be contained.

According to the invention, the three-dimensional photonic crystals may also be used in a layer without coating binders and coating additives. A composition of this type may contain the photonic crystals in a concentration of 1 to 70 weight %, preferably, in a concentration of 5 to 30% weight %, based on the total composition. This composition may also contain solvents as mentioned above and/or water and additives, such as dispersing agents and further additives, as mentioned above.

Crystallization of the monodisperse particles may, for example, also take place from the aqueous suspension produced during production of the monodisperse particles by suspension polymerization directly onto the substrate to be coated by spraying of the suspension and subsequent drying. A suspension of this type may contain the monodisperse particles in a quantity of 5 to 20% weight %, based on the suspension.

Such a suspension preferably contains the photonic crystals based on fluorinated crosslinked poly(meth)acrylates. This suspension is stable for a long time, e.g., for half a year and even longer.

Solid preparations may also be used which contain the photonic crystals up to, for example, 95 to 99 weight %.

The multi-layer coating according to the invention may be applied to the substrate surface by conventional methods, the priming coat, optionally, initially being applied to the untreated or pretreated substrate surface, then, for example, the base coat and the top coat, for example, by spraying, rolling, dipping, knife coating, flow coating and electrostatic coating.

The dry coat thickness is in the range of 3 to 50 μm, preferably 30 to 50 μm.

After application of the multi-layer coating, according to the invention, it is dried or stoved (baked), for example, dried for 10 minutes at 60° C., whereupon it may then be hardened by supplying heat in an oven; by IR irradiation or electron irradiation, for example, UV radiation. Thermal curing may, for example, take place at temperatures of 20 to 140° C.

The individual layers of the multi-layer coating, according to the invention may, optionally, also be dried or cured separately, for example, in particular, the layers containing the photonic crystals by drying, e.g., in the horizontal with a temperature of, e.g., 20 to 140° C.

Surfaces of substrates of different types may be coated with the multi-layer coating according to the invention. Substrates include, for example, metals, plastics, wood, glass, textiles.

Using the multi-layer coating and the method for producing the multi-layer coating, according to the invention, it is possible to produce coated substrate surfaces with high optical brilliance and a very good color flop. The intermediate adhesion of the individual layers of the multi-layer coating according to the invention corresponds to a conventional multi-layer coating, as is normally used, in particular, for metal and plastic coating, for example, for car bodies and car body parts. The multi-layer coating according to the invention has high color stability, in particular, owing to the high resistance to solvents and heat when using photonic crystals based on fluorinated (meth)acrylate monomers.

EXAMPLES

Example 1
Method for Producing Photonic Crystals Based on Fluorinated Monomers 150 ml ultra-pure water were introduced into a 250 ml flask and heated to 90° C. with introduction of nitrogen gas. After 45 minutes, the flow of nitrogen was stopped and 3 ml of a solution of 3.79 g 2,2,2-trifluoroethylmethacrylate and 0.80 g pentaerythritol tetramethacrylate were added. To initiate polymerization 5 ml of a 10% potassium peroxide sulphate solution were added as initiator at 90° C. after an additional 30 minutes. Nitrogen gas had previously been introduced into this solution in a 10 ml flask for 10 minutes and also at 90° C. After 1 h, the solution cooled down within 30 minutes. To purify the resulting polymer dispersion of coarse impurities, the cooled reaction solution was filtered. The filtrate was centrifuged repeatedly and redispersed in order to purify the polymer completely of low molecular reaction residues.

The mixture can be stored as a 5 to 20% aqueous suspension. The particles may settle down, but are able to re-disperse after agitating. The dispersion is stable for a long time, e.g., for half a year.

Crystallization of the monodisperse polymer dispersion obtained was brought about by drying on horizontal substrates. For this purpose, several 100 μl polymer suspension was coated onto glass areas of about 10 to 20 $cm^2$ and slowly dried. The crystals obtained were heated to about 70° C. for at least 2 h and detached from the glass substrate by stripping. Small pieces of crystal 50 to 500 μm in size resulted which can be screened to result in the desired particle size range.

The crystals had a highly brilliant color.
UV-VIS spectra: reduction in the transmission, narrow half-bandwidth of 5%, angle dependent optical reflection span: 100 nm (measured using spectrometer UV-2102 PC from Schimadzu)

Thermal stability: stable up to 250° C. (measured in an Linkam apparatus at a heating rate of 4° C./min using a SL 100 type microscope from Zeiss), Resistance to solvents: resistant to conventional solvents such as n-butylacetate, xylenes, alcohols, polyglycols, petroleum ethers.

Example 2
Production of a Coating Composition 2 g small pieces of crystal 5 to 25 μm in size, produced in Example 1, were scattered into a mixture of 50 g of Ebecryl® 600 (polyurethane resin of UCB Chemicals), 46 ml ethanol and 1.5 g photoinitiator Irgacure®0 1000 (Ciba Geigy) and homogeneously stirred in the mixture.

The red color effect of the small pieces of crystal was maintained in the process.

Example 3
Production of Multi-layer Coatings According to the Invention

Example 3a

The coating composition produced under Example 2 was applied to a metal sheet as a base coat by spraying having a dry coat thickness of 25 μm. The drying/stoving conditions are as follows: 5 minutes at room temperature, then 5 minutes at 60° C., then UV curing.

The clear coat 2K Protect 80 (DuPont) was then applied as a transparent top coat with a dry coat thickness of 40 μm. The drying/stoving conditions are as follows: 10 minutes at room temperature, 30 minutes at 130° C. The color effect of the crystals was maintained. The coating had a monodisperse color effect with high color brilliance and colour stability.

Example 3b

Crystallization of the monodisperse polymer dispersion from the 5 to 20% aqueous suspension according to Example 1 was brought about directly on the substrate to be coated by spraying of the suspension and subsequent drying in the horizontal at room temperature. A color photonic crystal layer formed. The dry coat thickness was 5 μm. The transparent top coat 2K Protect 80 was then applied with a dry coat thickness of 40 μm. The drying/stoving conditions are as follows: 10 minutes at room temperature, 30 minutes at 130° C. The color effect of the crystals was maintained. The coating had a monodisperse color effect with high color brilliance and color stability.

What is claimed is:

1. A multi-layer coating for coating a substrate surface, wherein the multi-layer coating comprises at least one color-imparting layer, containing at least one effect-imparting interference pigment comprising three-dimensional photonic crystals, wherein said photonic crystals are polymers based on poly(meth)acrylates, polystyrene, polyester, polyamides, or polyurethane.

2. The multi-layer coating according to claim 1, wherein the at least one layer comprising the three-dimensional photonic crystals is in direct contact with a pre-treated substrate surface as a color-imparting base layer.

3. The multi-layer coating according to claim 1, wherein the at least one layer comprising the three-dimensional photonic crystals is a color-imparting intermediate layer within the multi-layer coating.

4. The multi-layer coating according to claim 1, wherein the at least one layer comprising the three-dimensional photonic crystals is a color-imparting top layer.

5. The multi-layer coating according to claim 1, wherein the at least one layer comprising the three-dimensional photonic crystals is produced by deposition of the photonic crystals directly onto the substrate surface or onto a layer of the multi-layer coating.

6. The multi-layer coating according to claim 1, wherein the at least one layer comprising the three-dimensional photonic crystals is a coating composition based on coating binders and additional coating components.

7. The multi-layer coating according to claim 6, wherein the coating composition contains the three-dimensional photonic crystals in a concentration of 1 to 20 weight %, based on the weight of the coating composition.

8. The multi-layer coating according to claim 6, wherein the difference in the refractive indices of the photonic crystals and the coating composition is in the range of 0.01 to 2.

9. The multi-layer coating according to claim 1, wherein the at least one color-imparting layer contains the three-dimensional photonic crystals in a concentration of 0.1 to 70 weight %, based on the weight of the at least one color-imparting layer.

10. The multi-layer coating according to claim 1, wherein the three-dimensional photonic crystals have a main particle size of 5 to 500 $\mu$m.

11. The multi-layer coating according to claim 1, wherein the three-dimensional photonic crystals are inverse photonic crystals.

12. The multi-layer coating according to claim 1, wherein the three-dimensional photonic crystals are fluorinated polyalkyl(meth)acrylates.

13. The multi-layer coating according to claim 12, wherein the three-dimensional photonic crystals are formed from trifluoroethylmethacrylate, perfluoropropylmethacrylate, perfluorobutylmethacrylate and/or tetrafluorobutylbismethacrylate.

14. The multi-layer coating according to claim 12, wherein the three-dimensional photonic crystals may additionally contain pentaerythritoltetra(meth)acrylate and/or cinnamoylalkyl(meth)acrylate units.

15. A coated substrate surface coated with a multi-layer coating according to claim 1 and then cured.

16. A multi-layer coating for coating a substrate surface, comprising at least one color-imparting layer containing at least one effect-imparting interference pigment comprising three-dimensional photonic crystals, wherein said photonic crystals are polymers based on poly(meth)acrylates, or polyurethane.

* * * * *